US007391019B2

(12) United States Patent
Dunyach et al.

(10) Patent No.: US 7,391,019 B2
(45) Date of Patent: Jun. 24, 2008

(54) ELECTROSPRAY ION SOURCE

(75) Inventors: Jean-Jacques Dunyach, San Jose, CA (US); Nigel P. Gore, San Jose, CA (US); Paul R. Atherton, San Jose, CA (US)

(73) Assignee: Thermo Finnigan LLC, San Jose, CA (US)

( * ) Notice: Subject to any disclaimer, the term of this patent is extended or adjusted under 35 U.S.C. 154(b) by 213 days.

(21) Appl. No.: 11/491,439

(22) Filed: Jul. 21, 2006

(65) Prior Publication Data

US 2008/0073555 A1 Mar. 27, 2008

(51) Int. Cl.
*H01J 27/00* (2006.01)
*H01J 49/10* (2006.01)
*H01J 49/00* (2006.01)
*B01D 59/44* (2006.01)

(52) U.S. Cl. ........................ 250/288; 250/281; 250/289; 250/423 R

(58) Field of Classification Search ................. 250/288, 250/281, 289, 423 R
See application file for complete search history.

(56) References Cited

U.S. PATENT DOCUMENTS 5,171,990 A * 12/1992 Mylchreest et al. ......... 250/288
5,672,868 A 9/1997 Mordehai et al.
5,986,259 A 11/1999 Hirabayashi et al.
6,462,336 B1 10/2002 Bajic
6,528,784 B1 * 3/2003 Tang et al. .................. 250/282
2004/0227072 A1 * 11/2004 Park ........................... 250/288

* cited by examiner

*Primary Examiner*—Nikita Wells
(74) *Attorney, Agent, or Firm*—Freedman & Associates; Charles B. Katz

(57) ABSTRACT

An on-axis ion source has an ionization chamber and an adjacent low-pressure region. The on-axis ion source also includes a capillary tube having an axial bore for supporting fluid communication between the ionization chamber and the adjacent low-pressure region, the axial bore of the capillary tube being substantially concentrically aligned with the orifice of a skimmer located downstream in the ion path from the capillary tube. A blocking element is provided in an aligned facing arrangement with the axial bore of the capillary tube and on an opposite side of the orifice relative to the capillary tube. The blocking element receives droplets or particles flowing through the axial bore of the capillary tube and passing through the orifice of the skimmer. The combination of an on-axis arrangement and the use of a blocking element results in improved signal-to-noise level due to enhanced ion transmission and reduction of noise arising from passage of undesolvated droplets and particles to the mass analyzer.

22 Claims, 2 Drawing Sheets

ELECTROSPRAY ION SOURCE

FIELD OF THE INVENTION

The instant invention relates generally to electrospray ion sources, and more particularly to on-axis electrospray ion sources having reduced neutral noise.

BACKGROUND OF THE INVENTION

The electrospray process consists of flowing a sample liquid through a small tube or needle, which is maintained at a high voltage relative to a nearby surface. The voltage gradient at the tip of the needle causes the liquid to be dispersed into fine electrically charged droplets. The ionization mechanism involves desorption at atmospheric pressure of ions from the fine electrically charged particles. In many cases a heated gas is flowed in a direction that is counter-current to the electrospray, so as to enhance desolvation of the electrosprayed droplets. The ions created by the electrospray process are then mass analyzed using a mass analyzer.

Under appropriate conditions the electrospray resembles a symmetrical cone consisting of a very fine mist of droplets of ca. 1 μm in diameter. Excellent sensitivity and ion current stability is obtained if a fine mist is produced. Unfortunately, the electrospray "quality" is highly dependent on the bulk properties of the solution that is being analyzed, such as for instance surface tension and conductivity. A poor quality electrospray contains larger droplets of greater than 10 μm diameter, or a non-dispersed droplet stream.

The use of a sheath liquid and a focusing gas helps to ensure stable sprays when electrospraying high aqueous content sample solutions. One type of electrospray interface includes an inner needle for transferring a liquid sample to an ionizing region at one end of the needle, a first outer tube surrounding and spaced from said needle for flowing a sheath liquid past the tip of said needle, and a second outer tube surrounding the first tube to define a second cylindrical space for flowing a focusing gas past the end of said first tube and needle to focus the electrospray.

In U.S. Pat. No. 4,542,293, the entire contents of which is incorporated herein by reference, there is described the use of a tube made of an electrical insulator for conducting ions between the ionizing electrospray region at atmospheric pressure and an adjacent low-pressure region. A glass or quartz capillary is suitable for this purpose. Ions and gas are caused to flow from the ionization region through the tube and into the low-pressure region where free jet expansion occurs. A conductive coating is formed on the ends of the insulating tube and a voltage is applied thereacross to accelerate ions as they flow through the tube. A conducting skimmer is disposed adjacent the end of the tube and is maintained at a voltage which causes further acceleration of the ions through and into a lower pressure region including ion focusing lenses and analyzing apparatus.

In U.S. Pat. No. 5,171,990, the entire contents of which is incorporated herein by reference, there is described an electrospray ion source of the type which includes a capillary tube communicating between the ionizing region and a low-pressure region with a skimmer having an aperture through which ions pass. The skimmer separates the low-pressure region from a progressively lower pressure region, which includes ion focusing lenses and an analyzer. The capillary tube is oriented so that undesolvated droplets or particles travelling through the capillary are prevented from passing through the skimmer aperture into the analysis region. In particular, the axis of the capillary is altered or directed so that the axis is offset from the skimmer orifice. In this way, there is no alignment between the bore of the capillary and the orifice of the skimmer. The tendency is for the large droplets or particles to move to the center of the flow in the capillary and travel in a straight line. These droplets or particles traveling in a straight line strike the skimmer. The droplets or particles are thereafter pumped away. Unfortunately, the off-axis arrangement results in a portion of the electrosprayed sample being "clipped" such that the ion signal is reduced. Furthermore, the sample matrix tends to build up over time on the surface of the skimmer, which necessitates periodic cleaning and maintenance.

SUMMARY OF THE INVENTION

According to an aspect of the instant invention there is provided an ion source of the type which comprises an ionization chamber and an adjacent low-pressure region, the ion source comprising a capillary tube having an axial bore for supporting fluid communication between the ionization chamber and the adjacent low-pressure region, the axial bore of the capillary tube being substantially concentrically aligned with an orifice of a skimmer positioned to sample ions emitted from the capillary tube, the ion source further comprising a blocking element that is disposed in an aligned facing arrangement with the axial bore of the capillary tube and on an opposite side of the orifice relative to the capillary tube, wherein droplets or particles flowing through the axial bore of the capillary tube pass through the orifice of the skimmer and to the blocking element.

According to an aspect of the instant invention, provided is an ion source comprising: an ionization chamber for producing ions from a sample; an ion transfer tube having a first end and a second end opposite the first end, a channel that is open at the first end and at the second end being defined therebetween through the ion transfer tube; a low pressure chamber that is in fluid communication with the ionization chamber via the ion transfer tube, whereby ionization products exit the ionization chamber via the first end of the ion transfer tube and undergo free jet expansion within the low pressure chamber to form a plume at the second end of the ion transfer tube, the plume including a central portion containing droplets or particles; a skimmer having an orifice defined therethrough, the orifice in a spaced-apart facing relationship relative to the second end of the ion transfer tube and substantially concentrically aligned with the channel, the skimmer for sampling a portion of the plume including the central portion; and, a blocking element that is disposed in an aligned facing arrangement with the second end of the ion transfer tube and on an opposite side of the orifice relative to the ion transfer tube, the blocking element for receiving at least part of the central portion of the plume.

According to an aspect of the instant invention, provided is a mass spectrometer system comprising: a vacuum chamber comprising a front region, an intermediate region and a back region and having a progressively reduced pressure from the front region to the back region, the vacuum chamber comprising a skimmer that is disposed between the front region and the intermediate region, the skimmer having an orifice defined therethrough for supporting fluid communication between the front region and the intermediate region; means for producing ions from a sample in the liquid phase and at a pressure substantially higher than that of the front region of the vacuum chamber, and for introducing the ions into the front region of the vacuum chamber under free jet expansion conditions such that a portion of the jet pass through the orifice of the skimmer and into the intermediate region of the vacuum chamber; a blocking element disposed within the intermediate region of the vacuum chamber and adjacent to the orifice of the skimmer, the blocking element for receiving a central portion of the jet that is moving along a path between the orifice of the skimmer and the back region of the vacuum chamber; and, a mass analyzer disposed within the back region of the vacuum chamber for analyzing ions that are received from the intermediate region of the vacuum chamber.

BRIEF DESCRIPTION OF THE DRAWINGS

Exemplary embodiments of the invention will now be described in conjunction with the following drawings, in which similar reference numerals designate similar items.

DESCRIPTION OF EMBODIMENTS OF THE INSTANT INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein.

Figures 1, 2:
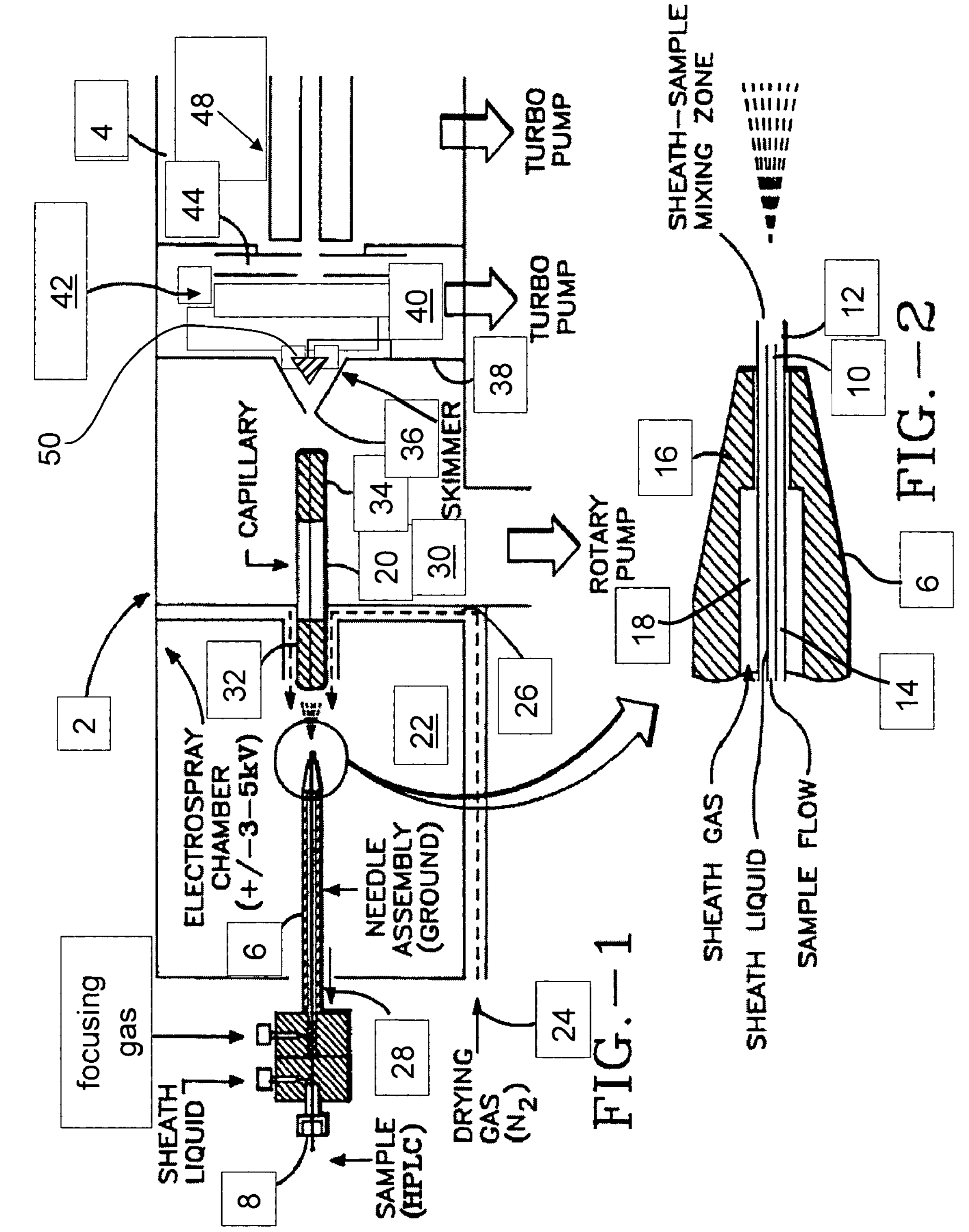
FIG. 1 shows an electrospray ion source coupled to an analyzing region via a capillary tube.
FIG. 2 shows an enlarged view of the tip of the electrospray needle of FIG. 1.

Referring to FIG. 1, an electrospray ion source 2 is shown schematically as associated with an analyzer chamber 4. The ion source 2 includes an input needle 6 into which a liquid sample 8 is introduced.

Now referring also to FIG. 2, the needle 6 includes a first tube 10 into which the liquid sample 8 is introduced. Surrounding the first tube 10 is a second tube 12 which defines with the first tube 10 an annular region 14 through which a sheath liquid is introduced for mixing with the sample liquid to reduce the surface tension and form fine droplets. An outer tube 16 forms a second annular region 18 with the second tube 12. A focusing gas is introduced through the second annular region 18 to focus the droplets as they exit the needle 6 towards a capillary tube 20 (also referred to as ion transfer tube). The needle 6 is maintained at a high voltage with respect to the nearby surfaces that form the electrospray chamber 22 (also referred to as ionization chamber) and as the liquid is dispersed, the droplets or particles are charged by the voltage gradient at the tip of the needle 6. The ionization mechanism involves desorption at “atmospheric pressure” of ions from the fine electrically charged particles. A counterflow of gas indicated by the arrow 24 enhances the desorption process. The gas flows through a chamber 26 past the end of the capillary 20 and exits the electrospray chamber 22 as indicated schematically at 28. For the sake of clarity, the term “atmospheric pressure” should not be construed as being limited to the nominal or actual ambient pressure of the environment in which the ion source is located, but instead denotes the full range of pressures at which the electrospray or equivalent source may be successfully operated, including pressures both below and above the ambient pressure.

A chamber 30 maintained at a pressure lower than the atmospheric pressure of the electrospray chamber 22 communicates with the electrospray chamber 22 via the capillary tube 20. Due to the differences in pressure, ions and gas are caused to flow through the capillary tube 20 into the chamber 30. A voltage is applied between conductive sleeves 32 and 34 to provide a voltage gradient. The end of the capillary tube 20 is supported in a spaced-apart facing arrangement relative to orifice 36 through skimmer 38, which separates the low-pressure region 30 from a lower pressure region 40. In particular, the axial bore of the capillary tube 20 is aligned with the orifice 36 of skimmer 38. The skimmer is followed by ion optics 42, which optionally comprises a second skimmer (not shown) and lenses 44 for directing ions into the analyzing chamber 46 and into a suitable analyzer 48.

Occasionally larger undesolvated droplets or particles (e.g. large ion-molecule clusters) traverse the capillary tube 20 and acquire sufficient kinetic energy to pass through the skimmer 38 and into the ion optics region 42. Some of the droplets or particles (or secondary ions derived therefrom) find their way into the analyzer detector and cause noise to be observed at the analyzer detector, thereby decreasing the signal-to-noise level and producing electronic spikes in the mass spectrum. As discussed above, the tendency is for these large droplets or particles to move to the center of the flow in the capillary tube 20 and travel in a straight line. Furthermore, these droplets or particles have sufficient kinetic energy that they continue traveling along a straight line toward orifice 36 of skimmer 38, their trajectory being more or less unaffected by the free-jet expansion of ions and gas at the end of capillary tube 20.

According to an embodiment of the instant invention, a blocking element 50 is provided on a side of the skimmer 38 that is opposite the capillary tube 20, such that an imaginary line extending along the center of the axial bore of capillary tube 20 passes through the orifice 36 and intersects the blocking element 50 on the other side. During use, the large droplets or particles tend to travel along this imaginary line, such that after passing through the orifice 36 they impinge upon the blocking element 50 and are prevented from traveling further toward the analysis region. Ions produced from the sample liquid flow past the blocking element and are focused into the analysis region using lenses 44.

Removing the large droplets or particles using an on-axis capillary tube 20 and blocking element 50 improves the signal-to-noise level in two ways: firstly, the plume of electrosprayed ions is not “clipped” since the axial bore of the capillary tube 20 is on-axis with the orifice 36 of skimmer 38, thereby increasing ion transmission efficiency and hence the signal level; and, secondly, the centrally located droplets or particles are removed from the plume of electrosprayed ions, such that the noise level is reduced.

Of course, it should be understood that the system that is shown in FIG. 1 is a specific and non-limiting example that is provided for illustrative purposes only. As will be obvious to one of skill in the art, many of the features that are shown in FIG. 1 are optional, and various modifications may be made without departing from the scope of the instant invention. For instance, the capillary tube 20 is shown in the form of an insulating material having conductive sleeves 32 and 34 disposed one each at opposite ends of the tube. Other types of ion transfer tube are known in the art and are optionally used in place of capillary tube 20. Similarly, the not illustrated second skimmer within the ion optics region 42 optionally is omitted.

Further optionally, the lenses 44 are replaced by or augmented with other suitable ion focusing components.

Accordingly, means is provided for producing ions at atmospheric pressure from a sample in the liquid phase, and for introducing the ions into the low-pressure region 30 under free jet expansion conditions such that a portion of the jet pass through the orifice 36 of skimmer 38 and into the lower pressure region 40. In generalized terms, the means includes an electrospray needle assembly for producing a mist of very fine droplets at atmospheric pressure and an ion transfer tube for transferring the ions and gas into the low-pressure region 30, such that free jet expansion occurs. The blocking element 50 that is provided within the lower pressure region 40 prevents larger droplets or particles from passing on through to the analysis region. In general, the blocking element 50 is mounted to a surface of skimmer 38 as shown in FIG. 1. Preferably, the blocking element 50 is maintained at ground potential so as to avoid charging. The structure of the blocking element 50 is discussed below in greater detail.

Figure 3:
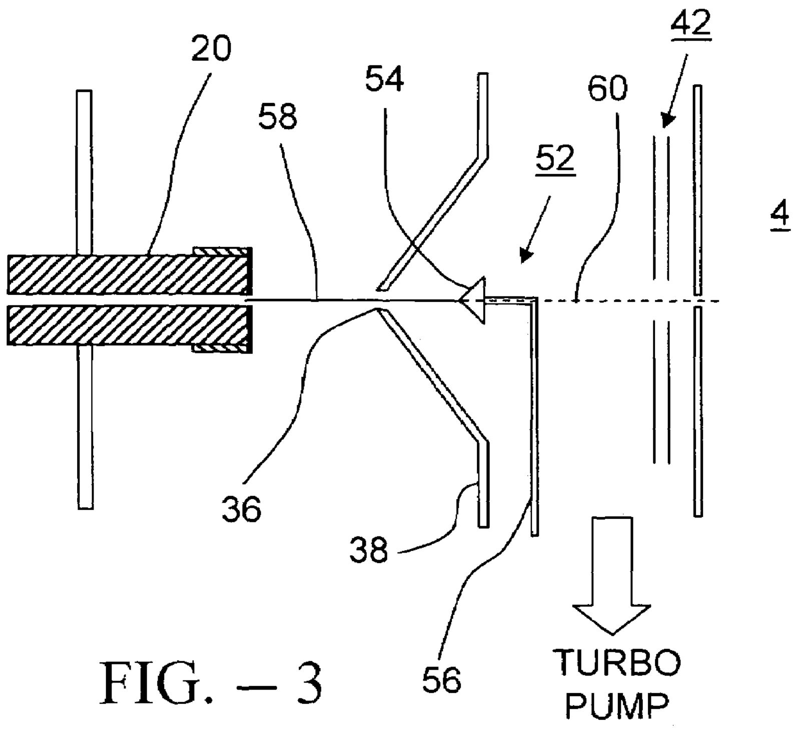
FIG. 3 shows an enlarged view of a portion of the electrospray ion source of FIG. 1, including a blocking element according to one embodiment of the instant invention; and, FIG. 4 shows an enlarged view of a portion of the electrospray ion source of FIG. 1, including a blocking element according to another embodiment of the instant invention.

Referring now to FIG. 3, shown is an enlarged view of a portion of the electrospray ion source of FIG. 1, including a blocking element according to one embodiment of the instant invention. In FIG. 3, the blocking element is provided in the form of a body 52 having a surface 54 facing the orifice 36 of skimmer 38, the body being disposed on a side of the skimmer 38 opposite the capillary tube 20. A mounting structure 56 is provided for mounting the body 52 to skimmer 38. By way of a non-limiting example, the body 52 is generally cone shaped with the apex directed toward the orifice 36. Optionally, the body 52 is generally wedge-shaped, presenting two surfaces at obtuse angles relative to the axial bore of the capillary tube 20. Further optionally, the body 52 is provided in another suitable shape. Representative dimensions are as follows, assuming that the diameter of orifice 36 is 1.9 mm, then cross-sectional dimensions of the body 52 are in the range 1-5 mm, and the body 52 is positioned approximately 8 to 12 mm from the orifice 36.

During use, the larger droplets or particles moving along imaginary line 58 in FIG. 3 impinge upon surface 54 of the body 52 and are deflected or otherwise prevented from continuing along the straight line (dotted line 60) to the analyzer chamber 4. Since the larger droplets and particles are not charged, they are not influenced by the ion optics 42, but instead are pumped away by the action of a vacuum pump associated with the lower pressure chamber.

Figure 4:
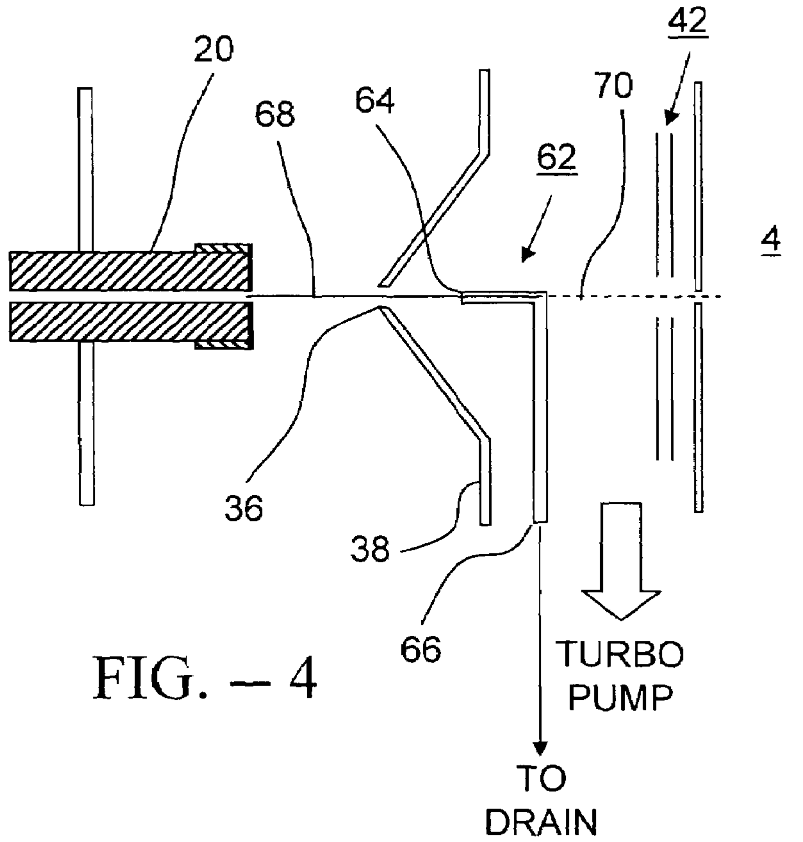

Referring now to FIG. 4, shown is an enlarged view of a portion of the electrospray ion source of FIG. 1, including a blocking element according to another embodiment of the instant invention. In FIG. 4, the blocking element is provided in the form of a tube 62 having a first end 64 facing the orifice for receiving the droplets or particles passing therethrough, a second end 66 and a not illustrated channel extending between the first end 64 and the second end 66, such that the droplets or particles that are received via the first end 64 are conducted through the channel and are expelled to drain via the second end 66. Optionally, the tube 62 is sharply bent or is smoothly curved. Further optionally, the drain is passive in nature relying upon gravity to expel the collected droplets and particles, or is actively pumped. Representative dimensions are as follows, assuming that the diameter of orifice 36 is 1.9 mm, then inside diameter of the tube 62 is in the range 1-2 mm, and the first end 64 of the tube 62 is positioned approximately 8 to 12 mm from the orifice 36.

During use, the larger droplets or particles moving along imaginary line 68 in FIG. 4 enter the not illustrated channel of tube 62 via the first end 64 and are prevented from continuing along the straight line (dotted line 70) to the analyzer chamber 4. The larger droplets or particles drain away via the second end 66.

Numerous other embodiments may be envisaged without departing from the spirit and scope of the invention.

What is claimed is:

1. An ion source of the type which comprises an ionization chamber and an adjacent low-pressure region, the ion source comprising a capillary tube having an axial bore for supporting fluid communication between the ionization chamber and the adjacent low-pressure region, the axial bore of the capillary tube being substantially concentrically aligned with an orifice of a skimmer positioned to sample ions emitted from the capillary tube, the ion source further comprising a blocking element that is disposed in an aligned facing arrangement with the axial bore of the capillary tube and on an opposite side of the orifice relative to the capillary tube, wherein droplets or particles flowing through the axial bore of the capillary tube pass through the orifice of the skimmer and to the blocking element, wherein the blocking element comprises a tube having a first end facing the orifice for receiving the droplets or particles passing therethrough.

2. An ion source according to claim 1, wherein the tube has a second end and a channel extending between the first end and the second end, whereby the droplets or particles that are received via the first end are conducted through the channel and are expelled via the second end.

3. An ion source according to claim 2, wherein the channel is non-linear between the first end and the second end.

4. An ion source according to claim 2, wherein the channel is connected to drain via the second end of the tube.

5. An ion source according to claim 1, wherein the blocking element is fixedly mounted to a surface of the skimmer.

6. An ion source according to claim 5, wherein the blocking element is maintained at ground potential.

7. An ion source according to claim 1, wherein the ionization chamber is maintained at atmospheric pressure.

8. An ion source comprising:

an ionization chamber for producing ions from a sample;

an ion transfer tube having a first end and a second end opposite the first end, a channel that is open at the first end and at the second end being defined therebetween through the ion transfer tube;

a low-pressure chamber that is in fluid communication with the ionization chamber via the ion transfer tube, whereby ionization products exit the ionization chamber via the first end of the ion transfer tube and undergo free jet expansion within the low-pressure chamber to form a plume at the second end of the ion transfer tube, the plume including a central portion containing droplets or particles;

a skimmer having an orifice defined therethrough, the orifice in a spaced-apart facing relationship relative to the second end of the ion transfer tube and substantially concentrically aligned with the channel, the skimmer for sampling at least a portion of the plume including the central portion; and, a blocking element that is disposed in an aligned facing arrangement with the second end of the ion transfer tube and on an opposite side of the orifice relative to the ion transfer tube, the blocking element for receiving at least part of the central portion of the plume, wherein the blocking element comprises a tube having a first end facing the orifice of the skimmer for receiving the droplets or particles within the central portion of the plume.

9. An ion source according to claim 8, wherein the tube has a second end and a channel extending between the first end and the second end, whereby the droplets or particles that are received via the first end are conducted through the channel and are expelled via the second end.

10. An ion source according to claim 9, wherein the channel is non-linear between the first end and the second end.

11. An ion source according to claim 9, wherein the channel is connected to drain via the second end of the tube.

12. An ion source according to claim 8, wherein the blocking element is fixedly mounted to a surface of the skimmer.

13. An ion source according to claim 12, wherein the blocking element is maintained at ground potential.

14. An ion source according to claim 8, wherein the ionization chamber is maintained at atmospheric pressure.

15. A mass spectrometer system comprising:

a vacuum chamber comprising a front region, an intermediate region and a back region and having a progressively reduced pressure from the front region to the back region, the vacuum chamber comprising a skimmer that is disposed between the front region and the intermediate region, the skimmer having an orifice defined therethrough for supporting fluid communication between the front region and the intermediate region;

means for producing ions from a sample in the liquid phase and at a pressure substantially higher than that of the front region of the vacuum chamber, and for introducing the ions into the front region of the vacuum chamber under free jet expansion conditions such that a portion of the jet pass through the orifice of the skimmer and into the intermediate region of the vacuum chamber;

a blocking element disposed within the intermediate region of the vacuum chamber and adjacent to the orifice of the skimmer, the blocking element for receiving a central portion of the jet that is moving along a path between the orifice of the skimmer and the back region of the vacuum chamber, wherein the blocking element comprises a tube having a first end facing the orifice of the skimmer for receiving the droplets or particles within the central portion of the jet; and, a mass analyzer disposed within the back region of the vacuum chamber for analyzing ions that are received from the intermediate region of the vacuum chamber.

16. A mass spectrometer system according to claim 15, wherein the means for producing ions from a sample in the liquid phase and for introducing the ions into the front region of the vacuum chamber comprises an electrospray ionization chamber including an electrospray needle, and an ion transfer tube having an axial bore extending between a first end within the electrospray ionization chamber and a second end within the front region of the vacuum chamber, and wherein the electrospray needle and the ion transfer tube are disposed in an aligned end-to-end arrangement such that ions that are produced at the tip of the electrospray needle enter the ion transfer tube.

17. A mass spectrometer system according to claim 16, wherein the blocking element is fixedly mounted to a surface of the skimmer.

18. A mass spectrometer system according to claim 17, wherein the blocking element is maintained at ground potential.

19. A mass spectrometer system according to claim 15, wherein the tube has a second end and a channel extending between the first end and the second end, whereby the droplets or particles that are received via the first end are conducted through the channel and are expelled via the second end.

20. A mass spectrometer system according to claim 19, wherein the channel is non-linear between the first end and the second end.

21. A mass spectrometer system according to claim 19, wherein the channel is connected to drain via the second end of the tube.

22. A mass spectrometer system according to claim 15, wherein the pressure substantially higher than that of the front region of the vacuum chamber is substantially atmospheric pressure.

* * * * *